(12) United States Patent
Ungureanu-Conteş et al.

(10) Patent No.: US 12,731,312 B2
(45) Date of Patent: Sep. 8, 2026

(54) DYNAMIC FRAME GENERATION BASED ON GENERATIVE PIPELINES

(71) Applicant: ADOBE INC., San Jose, CA (US)

(72) Inventors: Adrian-Ştefan Ungureanu-Conteş, Bucharest (RO); Andrei-Mario Dinu, Caras-Severin (RO); Nicu-Răzvan Stăncioiu, Craiova (RO); Ionuţ Mironică, Bucharest (RO)

(73) Assignee: ADOBE INC., San Jose, CA (US)

( * ) Notice: Subject to any disclaimer, the term of this patent is extended or adjusted under 35 U.S.C. 154(b) by 105 days.

(21) Appl. No.: 18/788,964

(22) Filed: Jul. 30, 2024

(65) Prior Publication Data

US 2026/0030807 A1 Jan. 29, 2026

(51) Int. Cl.

*G06T 11/60* (2026.01)
*G06T 5/50* (2006.01)
*G06T 7/194* (2017.01)

(52) U.S. Cl.

CPC ................ *G06T 11/60* (2013.01); *G06T 5/50* (2013.01); *G06T 7/194* (2017.01); *G06T 2207/20221* (2013.01)

(58) Field of Classification Search

None

See application file for complete search history.

(56) References Cited

U.S. PATENT DOCUMENTS

| | | | | |
|---|---|---|---|---|
| 11,983,806 | B1 * | 5/2024 | Ramesh | G06T 11/00 |
| 12,118,769 | B1 * | 10/2024 | Saraee | G06F 16/438 |
| 2018/0101972 | A1 | 4/2018 | Asente et al. | |

FOREIGN PATENT DOCUMENTS

| | | |
|---|---|---|
| AU | 2023204208 B | 6/2023 |
| GB | 2624753 B1 | 5/2024 |
| WO | 2012024988 | 3/2012 |

OTHER PUBLICATIONS

Couairon et al. ("Diffedit: Diffusion-Based Semantic Image Editing With Mask Guidance"). arXiv: 2210.11427, Oct. 20, 2022 (Year: 2022).*

Rombach, et al., "High-Resolution Image Synthesis with Latent Diffusion Models", In Proceedings of the IEEE/CVF Conference on Computer Vision and Pattern Recognition, 2022, pp. 10684-10695.

Balaji, et al., "ediffi: Text-to-Image Diffusion Models with an Ensemble of Expert Denoisers", arXiv preprint arXiv:2211.01324v1 [cs.CV] Nov. 2, 2022, pp. 1-24.

(Continued)

*Primary Examiner* — Yanna Wu

(74) *Attorney, Agent, or Firm* — F. CHAU & ASSOCIATES, LLC

(57) ABSTRACT

A method, apparatus, and non-transitory computer readable medium for image processing include obtaining a document element and an input prompt, wherein the input prompt describes a decoration element for the document element; generating a decoration mask based on the document element, wherein the decoration mask indicates a location for the decoration element; generating a decoration image based on the input prompt and the decoration mask, wherein the decoration image includes the decoration element; and generating a decorated document by combining the document element and the decoration image.

18 Claims, 9 Drawing Sheets

(56) References Cited

OTHER PUBLICATIONS

Meng, et al., "SDEdit: Guided Image Synthesis and Editing with Stochastic Differential Equations", arXiv preprint arXiv:2108.01073v2 [cs.CV] Jan. 5, 2022, pp. 1-33.
Couairon, et al., "DiffEdit: Diffusion-Based Semantic Image Editing with Mask Guidance", arXiv preprint arXiv:2210.11427v1 [cs.CV] Oct. 20, 2022, pp. 1-21.

* cited by examiner

FIG. 9

DYNAMIC FRAME GENERATION BASED ON GENERATIVE PIPELINES

BACKGROUND

The following relates generally to image processing, and more specifically generating document decorations using machine learning. Document decoration involves enhancing the visual appeal and thematic coherence of elements such as text boxes, shapes, or images within a document. Some methods for decorating document elements involve manual placement of pre-designed shapes, images, or patterns. These methods can be time-consuming and require specialized design skills.

Machine learning methods may be used in generating decorative patterns and designs. These machine learning methods include using diffusion models. The diffusion models learn to generate images by iteratively denoising random noise, guided by a learned denoising process.

SUMMARY

A method, apparatus, and non-transitory computer readable medium for image processing are described. One or more aspects of the method, apparatus, and non-transitory computer readable medium include obtaining a document element and an input prompt, wherein the input prompt describes a decoration element for the document element; generating a decoration mask based on the document element, wherein the decoration mask indicates a location for the decoration element; generating, using an image generation model, a decoration image based on the input prompt and the decoration mask, wherein the decoration image includes the decoration element; and generating a decorated document by combining the document element and the decoration image.

A method, apparatus, and non-transitory computer readable medium for image processing are described. One or more aspects of the method, apparatus, and non-transitory computer readable medium include obtaining a document element and an input prompt, wherein the input prompt describes a decoration element for the document element; performing a tiling operation using the decoration element to obtain a decoration pattern; generating a decoration mask based on the document element and the decoration pattern, wherein the decoration mask indicates a location for the decoration element; generating a decoration image including the decoration element based on the decoration mask and the input prompt; removing a background region from the decoration image to obtain a segmented decoration image; and generating a decorated document by combining the document element and the segmented decoration image.

An apparatus and method for image processing are described. One or more aspects of the apparatus and method include at least one processor; at least one memory storing instruction executable by the at least one processor; a mask generation component configured to generate a decoration mask based on a document element, wherein the decoration mask indicates a location for a decoration element; an image generation model comprising parameters stored in the at least one memory and trained to generate a decoration image including the decoration element based on the decoration mask and an input prompt that describes the decoration element; and a document generation component configured to generate a decorated document by combining the document element and the decoration image.

BRIEF DESCRIPTION OF THE DRAWINGS

FIG. 9 shows an example of an image processing device according to aspects of the present disclosure.

DETAILED DESCRIPTION

Figure 1:
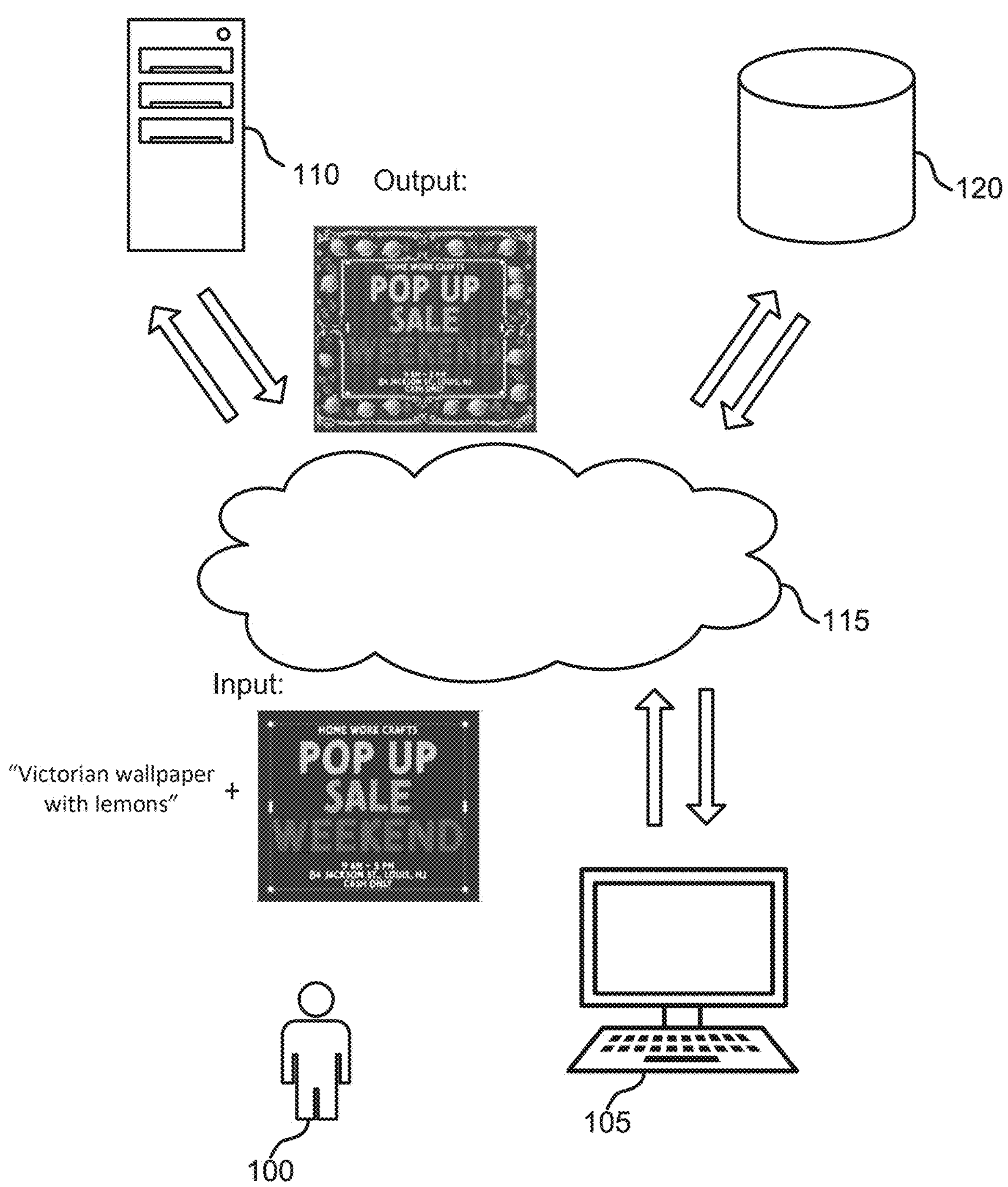
FIG. 1 shows an example of an image processing system according to aspects of the present disclosure.

The following relates generally to image processing, and more specifically to generating document decorations using machine learning. Document decoration involves enhancing the visual appeal and thematic coherence of elements such as text boxes, shapes, or images within a document. The process of decorating document elements contributes to creating visually engaging and polished documents, such as flyers, posters, invitations, or presentations.

Traditional methods for decorating document elements involve the manual placement of pre-designed shapes, images, or patterns around the target element. These methods can be time-consuming, especially when decorating multiple elements or creating consistent designs across a document. Moreover, these methods demand a high level of proficiency in specialized design skills from users to achieve visually appealing results.

Machine learning methods may be used in generating decorative patterns and designs. These machine learning methods include using diffusion models. The diffusion models learn to generate images by iteratively denoising random noise, guided by a learned denoising process. Some methods of using machine learning still lack the ability to integrate the generated decorations with the target document element, adapt to different element shapes and sizes, and facilitate user-guided customization of the decoration style and placement.

Embodiments of the present disclosure improve the accuracy of an image generation model by enhancing the quality and adaptability of decorative document elements. For example, a stylized decoration can be generated to adapt to the shape and size of a document element. Some embodiments achieve this improved quality and adaptability by generating a decoration mask based on the document element to indicate the location for the decoration, and then generating a decoration image using an image generation model based on an input prompt and the decoration mask. The generated decoration image includes the target decoration element and is customized based on the document element. A decorated document is generated by combining the original document element with the generated decoration image, resulting in a visually coherent and appealing design.

Image Processing System

According to embodiments of the present disclosure, a method for image processing is described. One or more aspects of the method include obtaining a document element and an input prompt, wherein the input prompt describes a decoration element for the document element; generating a decoration mask based on the document element, wherein the decoration mask indicates a location for the decoration element; generating, using an image generation model, a decoration image based on the input prompt and the decoration mask, wherein the decoration image includes the decoration element; and generating a decorated document by combining the document element and the decoration image.

Some examples of the method, apparatus, and non-transitory computer readable medium further include obtaining the decoration element. Some examples further include performing a tiling operation using the decoration element to obtain a decoration pattern. Some examples further include applying the decoration mask to the decoration pattern to obtain a masked decoration pattern, wherein the decoration image is generated based on the masked decoration pattern.

Some examples of the method, apparatus, and non-transitory computer readable medium further include obtaining the decoration element which comprises generating the decoration element based on the input prompt. Some examples of the method, apparatus, and non-transitory computer readable medium further include obtaining a tiling parameter from a user, wherein the decoration element is tiled based on the tiling parameter. In some aspects, the decoration mask indicates a region surrounding the document element.

Some examples of the method, apparatus, and non-transitory computer readable medium further include receiving a mask edit input from a user. Some examples further include modifying the decoration mask based on the mask edit input to obtain a modified decoration mask, wherein the decoration image is generated based on the decoration mask. Some examples of the method, apparatus, and non-transitory computer readable medium further include generating the decoration image which comprises performing a combination of a first diffusion-based editing algorithm and a second diffusion-based editing algorithm. In some aspects, the first diffusion-based editing algorithm comprises an SDEdit algorithm, and the second diffusion-based editing algorithm comprises a DiffEdit algorithm.

Some examples of the method, apparatus, and non-transitory computer readable medium further include obtaining a stylization strength parameter from a user, wherein the combination of the first diffusion-based editing algorithm and the second diffusion-based editing algorithm are combined based on the stylization strength parameter. Some examples of the method, apparatus, and non-transitory computer readable medium further include removing a background region from the decoration image to obtain a segmented decoration image, wherein the decoration document is generated using the segmented decoration image.

Some examples of the method, apparatus, and non-transitory computer readable medium further include selecting a first decoration mode based on a presence of the input prompt, wherein the decorated document is generated based on the first decoration mode. Some examples of the method, apparatus, and non-transitory computer readable medium further include selecting a second decoration mode. Some examples further include generating an alternative decorated document independent of the input prompt based on the second decoration mode.

According to embodiments of the present disclosure, a method for image processing is described. One or more aspects of the method include obtaining a document element and an input prompt, wherein the input prompt describes a decoration element for the document element; performing a tiling operation using the decoration element to obtain a decoration pattern; generating a decoration mask based on the document element and the decoration pattern, wherein the decoration mask indicates a location for the decoration element; generating a decoration image including the decoration element based on the decoration mask and the input prompt; removing a background region from the decoration image to obtain a segmented decoration image; and generating a decorated document by combining the document element and the segmented decoration image.

Some examples of the method, apparatus, and non-transitory computer readable medium further include receiving a mask edit input from a user. Some examples further include modifying the decoration mask based on the mask edit input to obtain a modified decoration mask, wherein the decoration image is generated based on the decoration mask. Some embodiments further include generating the decoration image by performing a combination of a first diffusion-based editing algorithm and a second diffusion-based editing algorithm. In some cases, the different algorithms can be combined in the same diffusion stage.

FIG. 1 shows an example of an image processing system according to aspects of the present disclosure. The image processing system is an example of, or includes aspects of, the corresponding element described with reference to FIGS. 2-6, and 9.

In the example shown in FIG. 1, user 100 provides a text prompt, for example, "Victorian wallpaper with lemons", and a document element to the image processing apparatus 110, e.g., via user device 105 and cloud 115. In this example, the document element includes a box in a rectangular shape provided by the user 100, having artistic expressions including stylized fonts within the box. The image processing apparatus 110 processes this text prompt and document element to generate a decorated document.

For example, the image processing apparatus 110 uses a mask generation component to create a decoration mask outlining the region around the document element, a tiling component to generate a decoration pattern based on the text prompt, and an image generation model to synthesize a decoration image incorporating the specified style and motifs while conforming to the decoration mask. The image processing apparatus 110 then uses a segmentation component to refine the decoration image and a document generation component to combine the original document element with the segmented decoration image, creating a visually cohesive and appealing decorated document.

In this example, user 100 may interact with the image processing apparatus 110 via a user interface, providing input and adjusting various parameters to customize the final output according to the user preference. The decorated document may include a rectangular box with stylized fonts surrounded by a Victorian wallpaper and lemon motif decoration. The decorated document is then returned to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., query answering, image editing, relationship detection). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote-control device interfaced with the user interface directly or through an I/O controller module). In some cases, a user interface may be a graphical user interface (GUI). In some examples, a user interface may be represented in code that is sent to the user device 105 and rendered locally by a browser. The process of using the image processing apparatus 110 is further described with reference to FIG. 2.

Image processing apparatus 110 includes a computer implemented network comprising an image encoder, a text encoder, a multi-modal encoder, and a decoder. Image processing apparatus 110 may also include a processor unit, a memory unit, an I/O module, and a training component. The training component is used in training a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 5-6. Further detail regarding the operation of image processing apparatus 110 is provided with reference to FIGS. 5-6.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user 100. The term cloud is sometimes used in describing data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with the database controller. In other cases, database controllers may operate automatically without user interaction.

Figure 2:
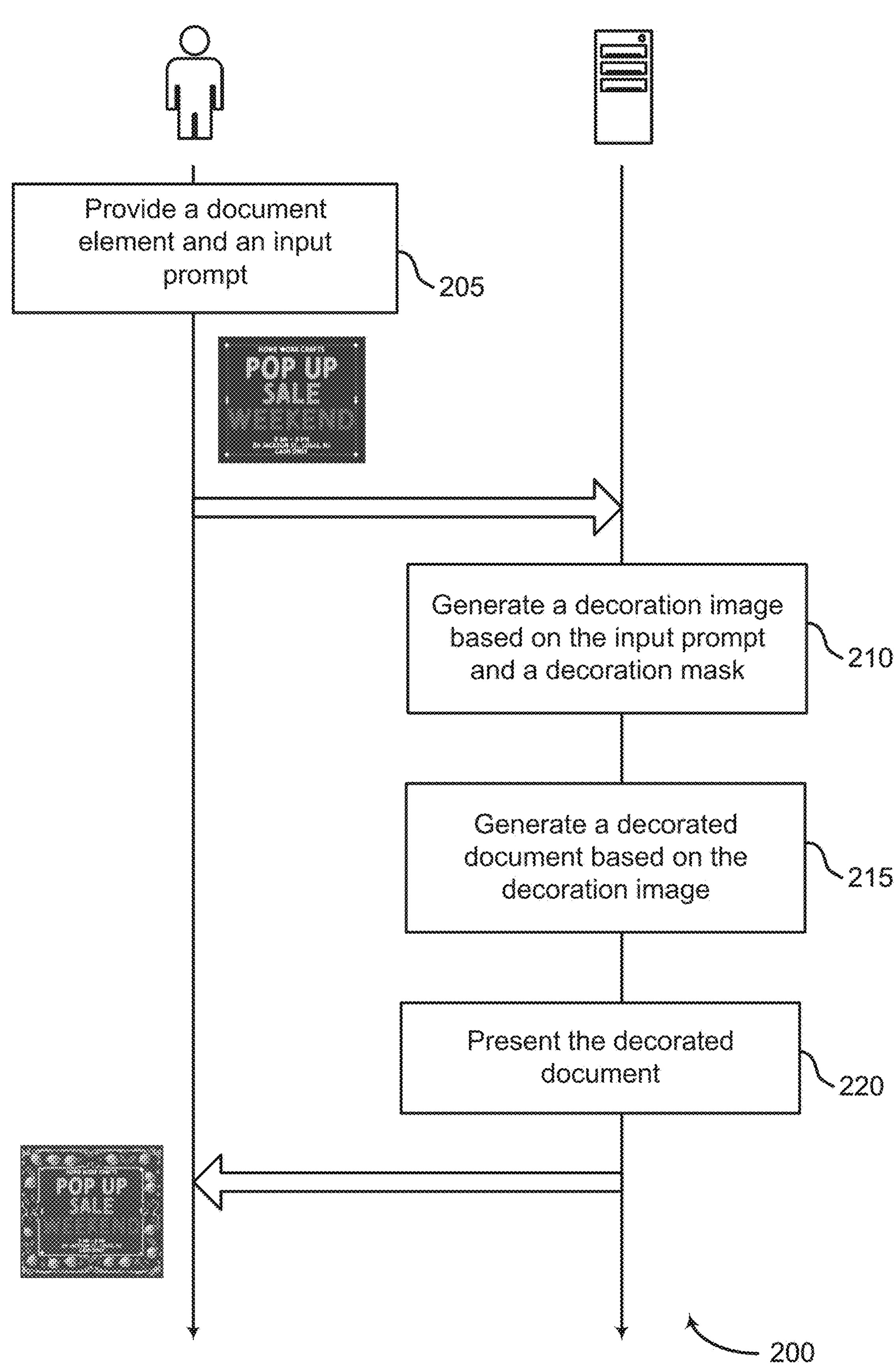
FIG. 2 shows an example of an image processing application according to aspects of the present disclosure.

FIG. 2 shows an example of an image processing application 200 according to aspects of the present disclosure. The image processing application 200 is an example of, or includes aspects of, the corresponding element described with reference to FIGS. 1, 3-6, and 9.

At operation 205, the user provides a document element and an input prompt to the image processing apparatus. In this example, the user provides a document element (e.g., a text box in a rectangular shape). A prompt may include a description of artistic expressions and stylized fonts within the box. For example, the user may also provide a text prompt, such as "Victorian wallpaper with lemons", to specify the desired style and motifs for the decoration.

At operation 210, the image processing apparatus generates a decoration image based on the input prompt and a decoration mask. For example, the system first generates a decoration mask that outlines the region surrounding the document element where the decoration will be applied. The system then uses a tiling component to create a decoration pattern based on the text prompt, for example, by repeating a single pattern element representing the Victorian wallpaper style and lemon motifs. The decoration mask and pattern are fed into an image generation model. The image generation model may include a diffusion model. The image generation model may synthesize the decoration image that incorporates the specified style and motifs while conforming to the shape and location indicated by the decoration mask.

At operation 215, the system generates a decorated document based on the decoration image. For example, the system employs a segmentation component to refine the decoration image by removing the background region, isolating the relevant decoration elements. The system then uses a document generation component to seamlessly combine the original document element (the triangular box with stylized fonts) with the segmented decoration image, aligning and integrating the decoration around the document element to create a visually cohesive and appealing decorated document.

At operation 220, the image processing apparatus presents the decorated document to the user. The output decorated document may depict the text element and the pattern (e.g., a rectangular text box with stylized fonts surrounded by a Victorian wallpaper and lemon motif decoration. The decorated document then is returned to the user via the cloud and user device. The user may view and interact with the decorated document through a user interface, allowing further customization and adjustment of the decoration parameters.

In some cases, the output document is a single-page document. However, in other examples, the document is a multi-page document with decorative elements on multiple pages. The decorative elements on each page may be generated to be consistent in style, but also tailored to the shape of text elements on each page. For example, the same pattern elements can be combined with different masks for each page to generate consistent decorative patterns for different pages of a document. In other examples, the same mask is used for each page of the multi-page document. In some examples, different variants of the pattern can be generated using the same mask and pattern elements for variety.

Figure 3:
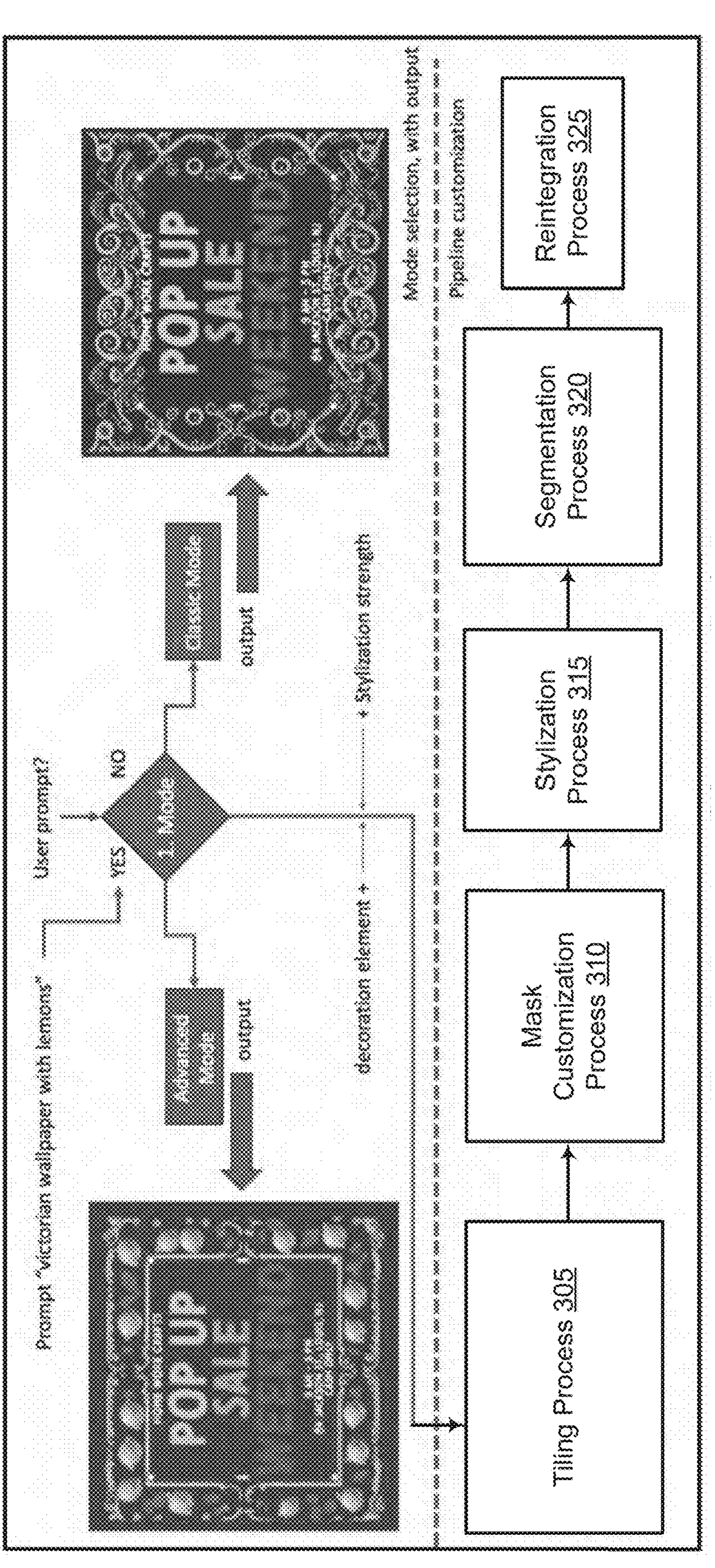
FIG. 3 shows an example of method for image processing according to aspects of the present disclosure.

FIG. 3 shows an example of an image processing method 300 according to aspects of the present disclosure. The image processing method 300 is an example of, or includes aspects of, the corresponding element described with reference to FIGS. 1, 2, 4-6, and 9.

According to embodiments of the present disclosure, a "single pattern element" refers to a decorative shape or design that can be used as the basic building block for creating the decoration around an object. For example, a single pattern element may be a simple, black and white image that is decorative and suitable for tiling. Given a diffusion pipeline $\Phi_i$, having a text prompt as input, in order to obtain a stylized image, a single pattern element $p_i$ may be defined as an image from $$\Psi \overset{def}{=} \{p_0, \ldots, p_n\},\ p_i \in \mathcal{M}[0.255]^3$$

that is a set of images including n single pattern elements describing various shapes. In some examples, these images may have binary colors (black and white), with the distinct property of being both decorative and suitable for tiling. In some examples, a single pattern element is the fleuron, a historical design element used for decorating medieval documents and significant works of calligraphy.

Embodiments of the present disclosure include a tiling strategy. In some cases, more than one tiling strategy may be used. Based on the stage in the pipeline where tiling t is applied to a region $X_i$ representing the vicinity of $O_i$, the tiling strategy may involve a singular-element stylization and an integral stylization. For singular-element stylization, the individual pattern element $p_i$ is stylized using the diffusion pipeline $\Phi_i$ and subsequently processed. The output is then tiled according to the region $X_i$. The singular-element stylization may be defined as:

$$d_{singular} = \tau(\Phi_i(p_i)) \tag{1}$$

For integral stylization, the single pattern element p is first tiled, then stylized with diffusion pipeline $\Phi_i$ and further processed, for example, segmented. The integral stylization may be defined as:

$$d_{integral} = \Phi_i(\tau(p_i)) \tag{2}$$

Embodiments of the present disclosure base the pipeline on the integral approach, producing intricate and non-repeating details. According to some embodiments, fitting a number of blocks in the vicinity $X_i$ around the selected object $O_i$ becomes less problematic as the diffusion process masks incoherent details. Embodiments of the present disclosure involve selecting a single pattern element among a plurality of single pattern elements, obtaining the tiled image, to then applying the region mask from $X_i$ to the tiled image.

Embodiments of the present disclosure include a stylization strategy. Referring to FIG. 3, the stylization strategy may include selecting a classic mode or an advanced mode. The stylization strategy may use tiling and prompt engineering methods to align the outputs with the target effect. In some examples, the classic mode may be selected to generate variations of classic patterns, and the prompt may be expressed as "flat embellish pattern classic black background". In some examples, the advanced mode may be selected to generate a plurality of stylizations based on the input prompt. For example, the prompt engineering used for the advanced mode may be expressed as: "flat embellish pattern"+prompt+"black background". The "prompt" in this expression corresponds to the input prompt provided by the user.

In some embodiments, given the diffusion pipeline @¿ remains fixed, the strategy employed for the stylization can be implemented using a diffusion-based editing algorithm. In some examples, SDEdit may be used. SDEdit refers to a method for image synthesis and editing that utilizes a diffusion model to iteratively denoise an input image (e.g., an image including injected noise corresponding to the strength of the SDEdit algorithm) guided by user input. For example, the diffusion process uses the input image (tiled pattern) as a guide-image. A given amount of noise is added to the guide-image, based on a given strength value for the stylization.

In some examples, DiffEdit may be used. DiffEdit refers to a specific method for semantic image editing using text-conditioned diffusion models. DiffEdit automatically generates a mask highlighting regions of the input image that need to be edited based on a text query, and then uses the diffusion model to edit the image while preserving content in the regions of interest. For example, the diffusion process uses the input image (tiled pattern) as a mask, to only insert noise in key areas. Embodiments of the present disclosure include focusing on the SDEdit, which allows for more control over the output stylization as this editing algorithm better retains the initial tiled structure.

Embodiments of the present disclosure include decoration mask customization methods. According to some embodiments, the stylization output can be further customized based on one or more of the following factors including the roundness of the vicinity $X_i$ of the object $O_i$, the size of $X_i$, which may be defined as the radius from the center of the object and the outer limits of $X_i$, a shape for $X_i$, a size of the selected single pattern element, and a custom single pattern element.

Embodiments of the present disclosure include segmentation strategies for stylization output. The segmentation strategy may be used in removing the background from the customized mask. In some examples, the segmentation involves tweaking the prompt engineering to a condition (e.g., specifying a "black background") and removing pixels based on a threshold. In some examples, the segmentation involves using an off-the-shelf segmentation model tasked with background segmentation.

In some examples, the stylization of the edges in an image may disqualify the images from use cases expected by segmentation networks. These networks anticipate the object of interest to be centered. As a result, a generic segmentation model fails and incorrectly identifies the interior part of the decoration (black pixels) as the object. To address this, the pipeline includes a fine-tuned segmentation network to ensure accurate segmentation of the objects of interest. In some examples, the system according to embodiments of the present disclosure including integral stylization may be integrated into online design tools for application and for obtaining feedback from users.

Embodiments of the present disclosure selecting among more than one single pattern elements, three levels of stylization strength, and selecting between a classic pattern that has variations of the input single pattern element, and an advanced stylization that is based on an input prompt. In some cases, when a stylization prompt is provided, the system may select the advanced mode. In some cases, when a stylization prompt is not provided, the system may select the classic mode.

Embodiments of the present disclosure include a mask customization strategy. In some examples, given a single pattern element, a mask may be generated by applying a tiling effect, which can be further used as a guide for image stylization. In some examples, the mask customization strategy may involve dynamically determining the dimensions of the mask based on the width and height of the object box, such as a text box, which indicates the vicinity of the selected object. In some examples, a tiling filter may be applied on a single pattern element.

Embodiments of the present disclosure include using the customized mask as a guide for a stylization strategy. In some examples, the output of the stylization may be an image with a background of a color that is indicated by the input text prompt.

Embodiments of the present disclosure provide a segmentation strategy. The segmentation strategy may be used in filtering the stylized image of background colors. In some examples, this involves use creating a Euclidean distance filter from a given image to a specific background color, as in Equation (3):

$$|\text{Image}^{RGB} - \text{Background}^{RGB}| < 0.52, \quad (3)$$

where $\text{Image}^{RGB}$ corresponds to the color image that is being segmented, Background RGB corresponds to the reference image (expected background color) and 0.52 is a threshold value corresponding to the minimum L2 distance. Pre-existing APIs allow for multiple segmentation strategies. Embodiments of the present disclosure demonstrate the Euclidean distance-based filter may be used for implementation. The output of the image processing system may be generated by combining the segmentation result over the document content.

Referring to FIG. 3, tiling process 305 involves tiling a single pattern element in an area surrounding an input object to generate a decoration mask. The single pattern element may be a small, decorative shape or design that can be used as the basic building block for creating the decoration. The tiling process may make the single pattern element replicated in a consistent and coherent manner, filling the desired decoration area around the input object.

Mask customization process 310 involves customizing the decoration mask generated by tiling process 305. The customization process 310 can be based on factors such as the roundness of the vicinity of the input object, the size of the vicinity, the shape of the vicinity, the size of the selected single pattern element, or a custom single pattern element. This process allows for further refinement and personalization of the decoration mask.

Stylization process 315 involves applying a stylization to the customized decoration mask using a generative model. The stylization strategy may include selecting a classic mode or an advanced mode. In the classic mode, variations of classic patterns are generated, while in the advanced mode, a plurality of stylizations are generated based on an input prompt. The stylization process may employ diffusion-based editing algorithms, such as SDEdit or DiffEdit, to add noise to the decoration mask based on a given strength value or to insert noise in key areas.

Segmentation process 320 involves segmenting the stylized decoration mask to remove the background and obtain the final stylized decoration. The segmentation strategy may involve tweaking the prompt engineering to specify a background color and removing pixels based on a threshold. Alternatively, an off-the-shelf segmentation model or a fine-tuned segmentation network can be used for background segmentation. The segmentation process ensures that the stylized decoration is accurately extracted from the background. The output of the image processing system is generated by combining the segmented stylized decoration with the input object or the document content.

Figure 4:
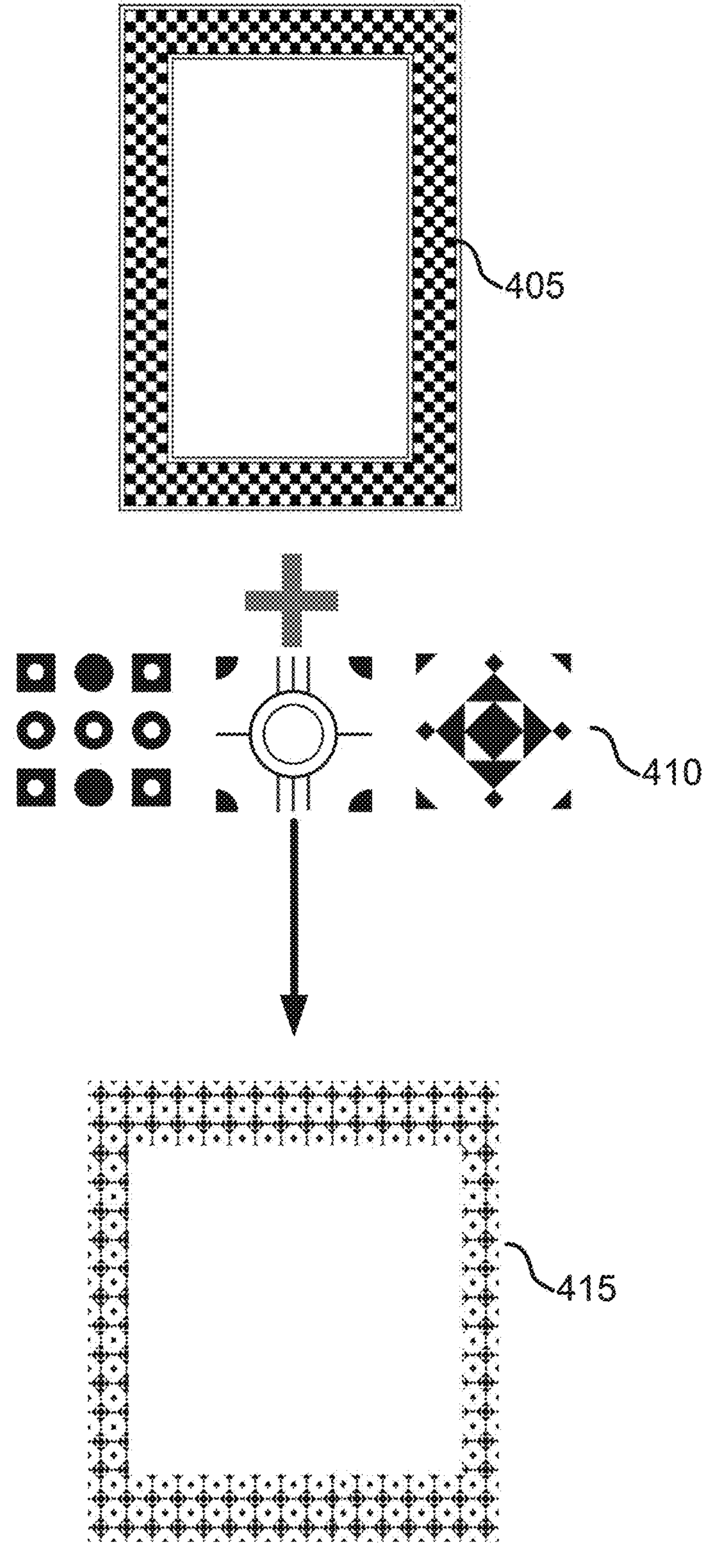
FIG. 4 shows an example generating a decoration image according to aspects of the present disclosure.

FIG. 4 shows an example of a masked decoration pattern generation method 400 according to aspects of the present disclosure. The masked decoration pattern generation method 400 is an example of, or includes aspects of, the corresponding element described with reference to FIGS. 1-3, 5, 6, and 9.

Referring to FIG. 4, decoration mask 405 represents the area surrounding an input object where the stylized decoration will be applied. The decoration mask is generated based on the dimensions of the input object, such as a text box, which indicates the vicinity of the selected object. In some examples, the size and shape of the decoration mask can be dynamically determined or customized based on user preferences.

Single pattern elements 410 represent a collection of small, decorative shapes or designs that serve as the basic building blocks for creating the overall decoration. These single pattern elements can be simple, black and white images that are highly decorative and suitable for tiling. Examples of single pattern elements include small floral shapes, geometric designs, or simplified fleuron-like elements. In some examples, the system selects a single pattern element from the single pattern elements 410 to be used in the tiling process. The selection of the single pattern element can be based on user preferences, predefined criteria, or random selection.

Masked decoration pattern 415 is generated by tiling the selected single pattern element within the decoration mask 405. The tiling process involves replicating the selected single pattern element in a consistent and coherent manner, filling the desired decoration area defined by the decoration mask. The tiling process ensures that the single pattern element is repeated seamlessly, creating a continuous and visually appealing pattern around the input object. The masked decoration pattern 415 may be further processed and modified through stylization methods based on user preferences and target effects according to embodiments of the present disclosure.

Image Processing Apparatus

According to embodiments of the present disclosure, an apparatus for image processing is described. One or more aspects of the apparatus include at least one processor; at least one memory storing instruction executable by the at least one processor; a mask generation component configured to generate a decoration mask based on a document element, wherein the decoration mask indicates a location for a decoration element; an image generation model comprising parameters stored in the at least one memory and trained to generate a decoration image including the decoration element based on the decoration mask and an input prompt that describes the decoration element; and a document generation component configured to generate a decorated document by combining the document element and the decoration image.

Some examples of the apparatus and method further include a tiling component configured to generate a decoration pattern based on the input prompt, wherein the decoration image is generated based on the decoration pattern. Some examples of the apparatus and method further include a segmentation component configured to remove a background region from the decoration image to obtain a segmented decoration image, wherein the decoration document is generated using the segmented decoration image. Some examples of the apparatus and method further include a user interface configured to receive a stylization strength parameter, wherein the decoration image is generated based on the stylization strength parameter. In some aspects, the image generation model comprises a diffusion model.

Figure 5:
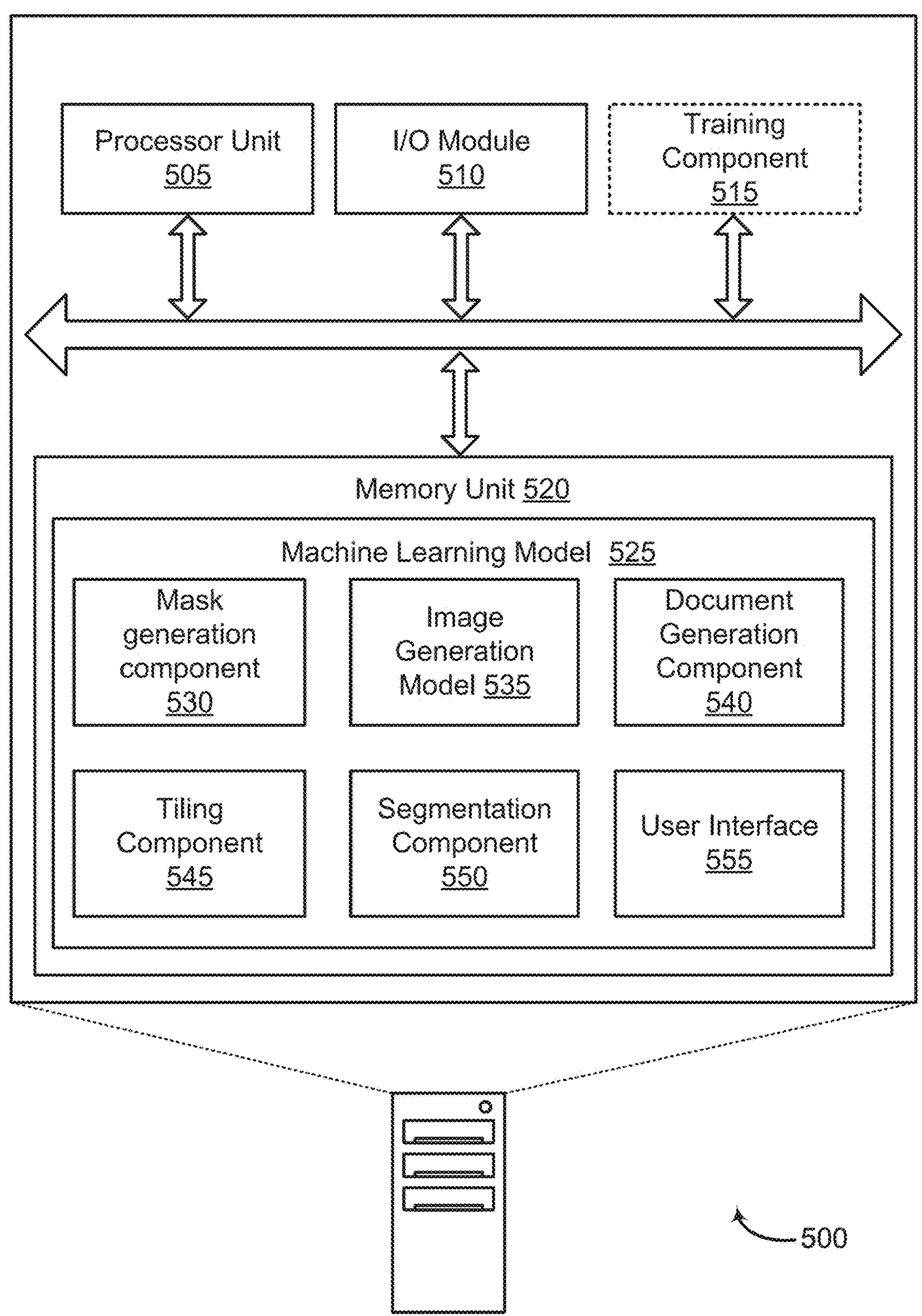
FIG. 5 shows an example of an image processing apparatus according to aspects of the present disclosure.

FIG. 5 shows an example of an image processing apparatus 500 according to aspects of the present disclosure. The image processing apparatus 500 is an example of, or includes aspects of, the corresponding element described with reference to FIGS. 1-4, 6, and 9. In one aspect, image processing apparatus 500 includes processor unit 505, I/O module 510, training component 515, memory unit 520, and machine learning model 525. Machine learning model 525 includes mask generation component 530, image generation model 535, document generation component, tiling component 545, segmentation component 550, and user interface 555.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 520 to perform various functions. In some aspects, processor unit 505 includes special purpose components for modem processing, baseband processing, digital signal processing, or transmission processing. According to aspects, processor unit 505 comprises one or more processors described with reference to FIG. 9.

Memory unit 520 includes one or more memory devices. Examples of a memory device include random access memory (RAM), read-only memory (ROM), or a hard disk. Examples of memory devices include solid state memory and a hard disk drive. In some examples, memory is used in storing computer-readable, computer-executable software including instructions that, when executed, cause at least one processor of processor unit 505 to perform various functions described herein.

In some cases, memory unit 520 includes a basic input/output system (BIOS) that controls basic hardware or software operations, such as an interaction with peripheral components or devices. In some cases, memory unit 520 includes a memory controller that operates memory cells of memory unit 520. For example, the memory controller may include a row decoder, column decoder, or both. In some cases, memory cells within memory unit 520 store information in the form of a logical state. According to aspects, memory unit 520 comprises the memory subsystem described with reference to FIGS. 1-4, 6, and 9.

According to aspects, image generation apparatus 500 uses one or more processors of processor unit 505 to execute instructions stored in memory unit 520 to perform functions described herein. For example, in some cases, the image generation apparatus 500 obtains a prompt describing an image element. For example, the image element may correspond to a plurality of concepts.

Machine learning parameters, also known as model parameters or weights, are variables that provide a behavior and characteristics of a machine learning model. Machine learning parameters can be learned or estimated from training data and are used for making predictions or performing tasks based on learned patterns and relationships in the data.

Machine learning parameters are typically adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used in making predictions on new, unseen data.

Artificial neural networks (ANNs) have numerous parameters, including weights and biases associated with each neuron in the network, which control a degree of connections between neurons and influence the neural network's ability to capture complex patterns in data. An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes.

In some cases, the signals between nodes comprise real numbers, and the output of each node is computed by a function of the sum of its inputs. In some examples, nodes may determine their output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Referring to FIG. 5, machine learning model 525 includes mask generation component 530, image generation model 535, document generation component, tiling component 545, segmentation component 550, and user interface 555.

Mask generation component 530 generates a decoration mask based on a document element. The document element can be a text box, image, shape, or an object within a document that is intended to be decorated. The decoration mask may indicate the location where the decoration element will be applied. For example, mask generation component 530 determines the region around the document element for placing the decoration.

Image generation model 535 may be a trained model that generates a decoration image including the decoration element based on the decoration mask and an input prompt. In some examples, the input prompt is a textual description provided by the user that specifies the target style, pattern, or characteristics of the decoration element. In some examples, the image generation model takes the decoration mask and the input prompt as inputs and synthesizes a visually appealing and coherent decoration image that aligns with the specified style and location.

Document generation component 540 generates the final decorated document by combining the original document element with the generated decoration image. For example, document generation component 540 integrates the decoration image with the document element, generating desired alignment, size, and position. The output decorated document may demonstrate the document element modified with the stylized decoration.

Tiling component 545 generates a decoration pattern based on the input prompt. Tiling component 545 selects a single pattern element and repeats it in a grid-like structure to create a decoration pattern. The tiling component 545 may employ various tiling techniques based on user-defined parameters. The generated decoration pattern can be used for creating the decoration image.

Segmentation component 550 removes the background region from the decoration image to obtain a segmented decoration image. In some examples, segmentation component 550 applies an image segmentation technique to separate the decoration element from the background. For example, the segmentation component 550 identifies and removes the background region, leaving the relevant decoration element in the segmented decoration image. The segmented decoration image is then used by the document generation component to create the output decorated document.

User interface 555 allows user interaction with the apparatus. In some examples, user interface 555 provides a means for the user to input the document element, specify the input prompt, and adjust various parameters. For example, the user interface may receive a stylization strength parameter that controls the intensity or prominence of the decoration element in the generated decoration image. The user interface may also display the generated decorated document and allow the user 100 to make further modifications or adjustments. The image generation model 535 may include a diffusion model.

Figure 6:
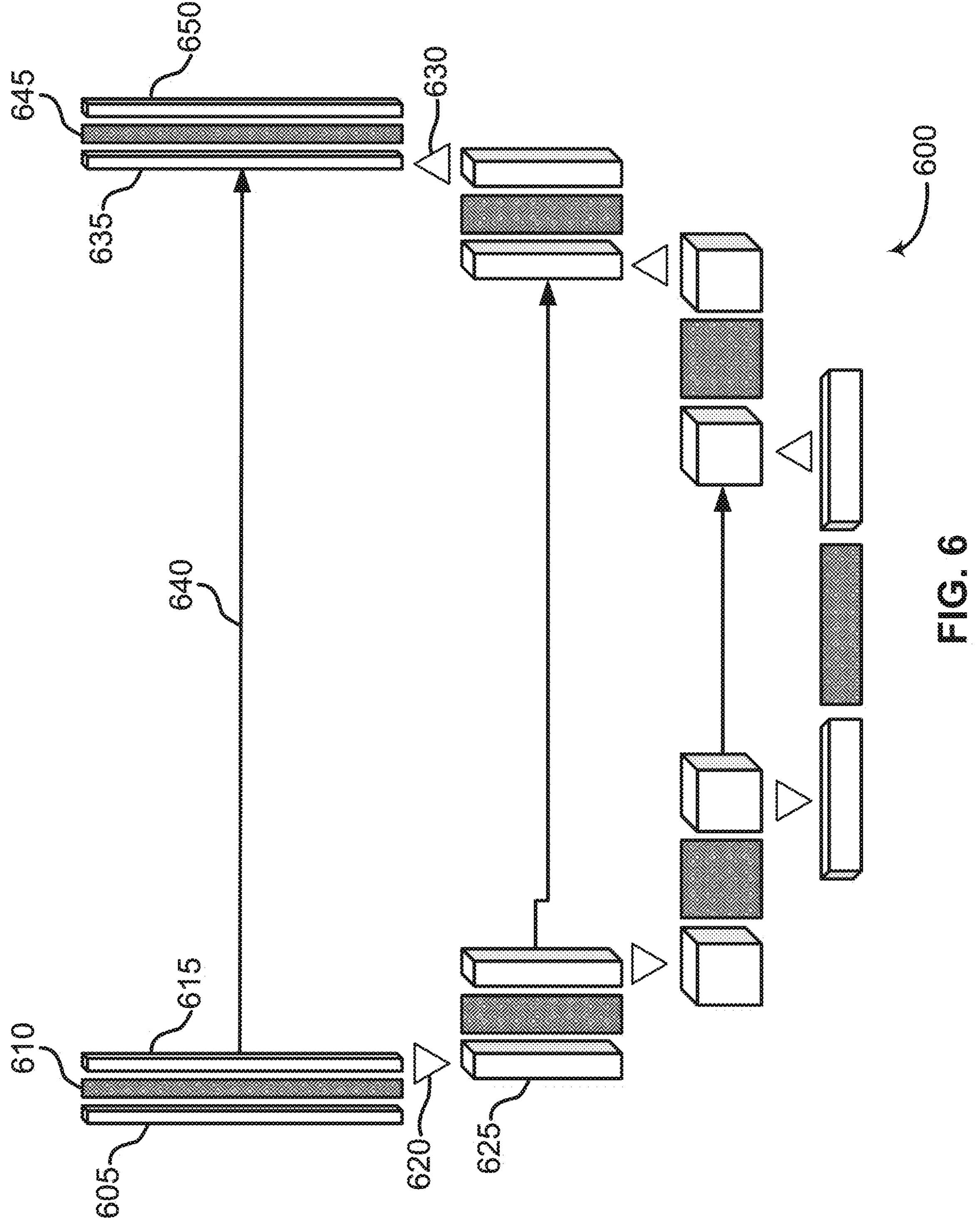
FIG. 6 shows an example of an image generation model according to aspects of the present disclosure.

FIG. 6 shows an example of an image processing model 600 according to aspects of the present disclosure. The image processing model 600 is an example of, or includes aspects of, the corresponding element described with reference to FIGS. 1-4, 6, and 9. According to some aspects, image generation model 600 comprises a diffusion model including an ANN architecture such as a U-Net.

According to some aspects, image generation model 600 receives input features 605, where input features 605 include an initial resolution and an initial number of channels, and processes input features 605 using an initial neural network layer 610 (e.g., a convolutional neural network layer) to produce intermediate features 615. In some cases, intermediate features 615 are then down-sampled using a down-sampling layer 620 such that down-sampled features 625 have a resolution less than the initial resolution and a number of channels greater than the initial number of channels.

In some cases, this process is repeated multiple times, and then the process is reversed. For example, down-sampled features 625 are up-sampled using up-sampling process 630 to obtain up-sampled features 635. In some cases, up-sampled features 635 are combined with intermediate features 615 having the same resolution and number of channels via skip connection 640. In some cases, the combination of intermediate features 615 and up-sampled features 635 are processed using final neural network layer 645 to produce output features 650. In some cases, output features 650 have the same resolution as the initial resolution and the same number of channels as the initial number of channels.

According to some aspects, image generation model 600 receives additional input features to produce a conditionally generated output. In some cases, the additional input features include a vector representation of an input prompt. In some cases, the additional input features are combined with intermediate features 615 within image generation model 600 at one or more layers. For example, in some cases, a cross-attention module is used in combining the additional input features and intermediate features 615.

According to embodiments of the present disclosure, a method, apparatus, and non-transitory computer readable medium for training a machine learning model are described. One or more aspects of the method include obtaining a training set including a ground-truth image depicting an entity, pose information indicating a target pose of the entity, and a part image depicting a target part of the entity and training, using the training set, an image generation model to generate an output image that depicts the entity with the target pose and the target part.

Some examples of the method, apparatus, and non-transitory computer readable medium for training a machine learning model comprise computing a multi-task loss function including an entity-part loss term and a pose-warp loss term; and updating parameters of the image generation model based on the multi-task loss function. In some aspects, the entity-part loss term is based on a segmentation map for the target part of the entity. In some aspects, the pose-warp loss term is based on a visibility map corresponding to the target pose of the entity. In some aspects, the multi-task loss function includes a diffusion loss term. Some examples of the method for training a machine learning model comprises obtaining the training set comprises applying a pose detection model to the ground-truth image to the pose information. Some examples of the method, apparatus, and non-transitory computer readable medium for training a machine learning model further include obtaining the training set comprises applying a segmentation model to the ground-truth image to obtain the part image. In some cases, obtaining a training set can include creating training samples for training the machine learning model.

Image Processing Method

Figure 7:
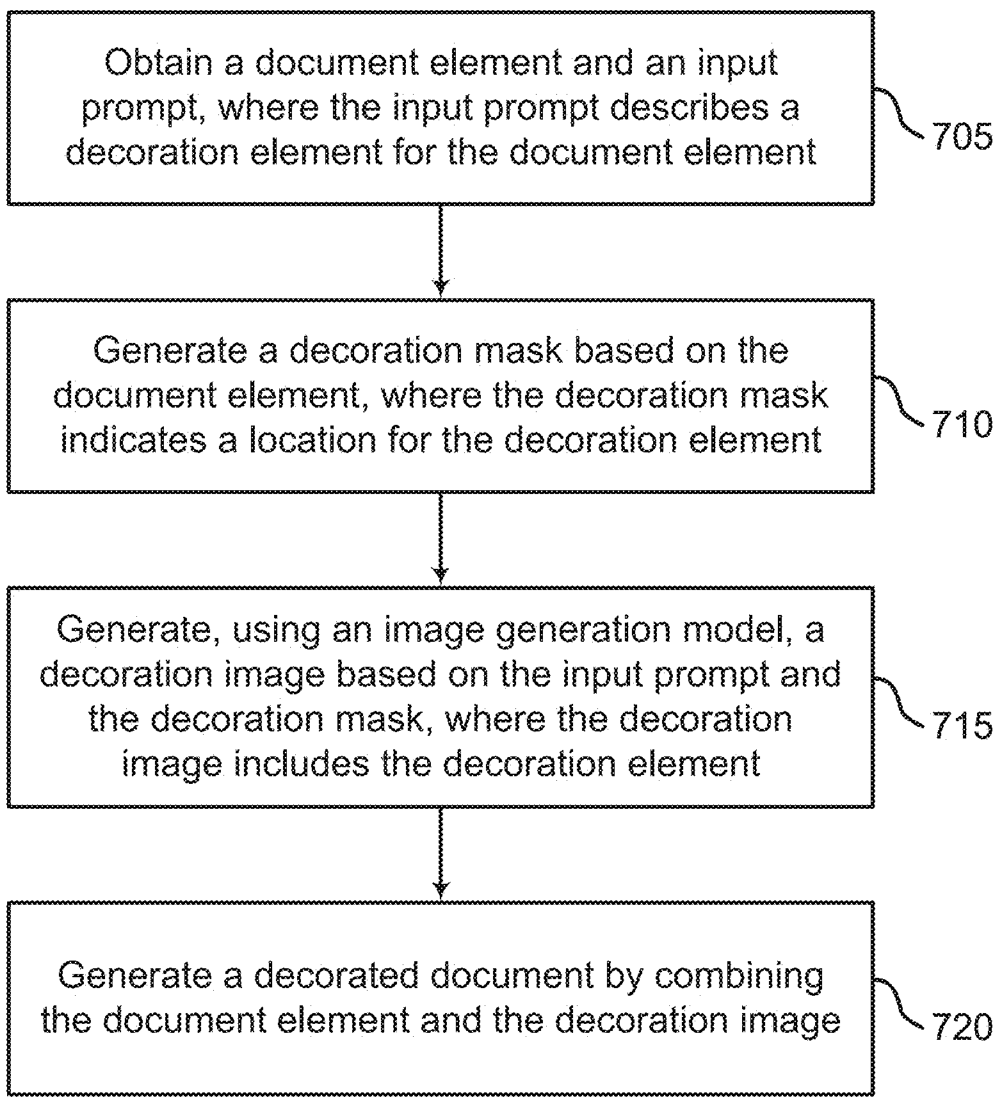
FIG. 7 shows a method for image processing according to aspects of the present disclosure.

FIG. 7 shows an example of a method 700 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains a document element and an input prompt, where the input prompt describes a decoration element for the document element. In some cases, the operations of this step refer to, or may be performed by, an image generation model as described with reference to FIGS. 1, 3, 5, and 9.

In some examples, the document element at operation 705 represents the content or object within a document that is to be decorated, such as a text box, image, or shape. The input prompt is a textual description provided by the user that specifies the target characteristics or style of the decoration element. For example, the user may input a prompt like "Victorian wallpaper with lemons" or "floral pattern with vibrant colors." The input prompt may be used for guiding the generation of the decoration element and determining the style of the decoration applied to the document element.

At operation 710, the system generates a decoration mask based on the document element, where the decoration mask indicates a location for the decoration element. In some cases, the operations of this step refer to, or may be performed by, a mask generation component as described with reference to FIGS. 1, 3, 5, and 9.

In some examples, generating the decoration mask involves determining the area surrounding the document element where the decoration will be applied. The dimensions and shape of the decoration mask can be dynamically determined based on the size and characteristics of the document element. For example, when the document element is a text box, the decoration mask may be generated to cover the vicinity around the text box based on factors including the width, height, and margins of the text box.

In some examples, the decoration mask generation may involve obtaining a decoration element and performing a tiling operation based on the input prompt to create a decoration pattern. The decoration mask is then applied to the decoration pattern to obtain a masked decoration pattern, which serves as the basis for generating the decoration image. The decoration element can be obtained by generating it based on the input prompt or selecting it from a predefined set of elements. Additionally, the system may obtain a tiling parameter from the user to control the tiling process of the decoration element.

At operation 715, the system generates, using an image generation model, a decoration image based on the input prompt and the decoration mask, where the decoration image includes the decoration element. In some cases, the operations of this step refer to, or may be performed by, an image generation model as described with reference to FIGS. 1, 3, 5, and 9.

In some examples, generating the decoration image involves using an image generation model, such as a diffusion model, to create a target decoration based on the input prompt and the decoration mask. For example, the image generation model may use the content and style specified by the input prompt and apply the content and style to the regions indicated by the decoration mask.

In some examples, generating the decoration image may involve performing multiple diffusion-based editing algorithms, such as SDEdit and DiffEdit, and combining their outputs to achieve the desired stylization. For example, the system may obtain a stylization strength parameter from the user to control the balance between the outputs of different editing algorithms. Additionally, the system may receive a mask editing input from the user to modify the decoration mask and generate the decoration image based on the modified mask.

At operation 720, the system generates a decorated document by combining the document element and the decoration image. In some cases, the operations of this step refer to, or may be performed by, a document generation component as described with reference to FIGS. 1, 3, 5, and 9.

In some examples, generating the decorated document involves integrating the decoration image with the document element. For example, operation 720 may involve aligning the decoration image with the document element, adjusting the size and position of the decoration image, and blending the edges to create a visually coherent result.

In some examples, before combining the decoration image with the document element, the system may perform a background removal process to obtain a segmented decoration image. This segmentation process retains the relevant parts of the decoration image in the final decorated document. In some cases, the system may provide different decoration modes, such as a prompt-based mode and a prompt-independent mode, to generate alternative decorated documents based on user preferences.

Figure 8:
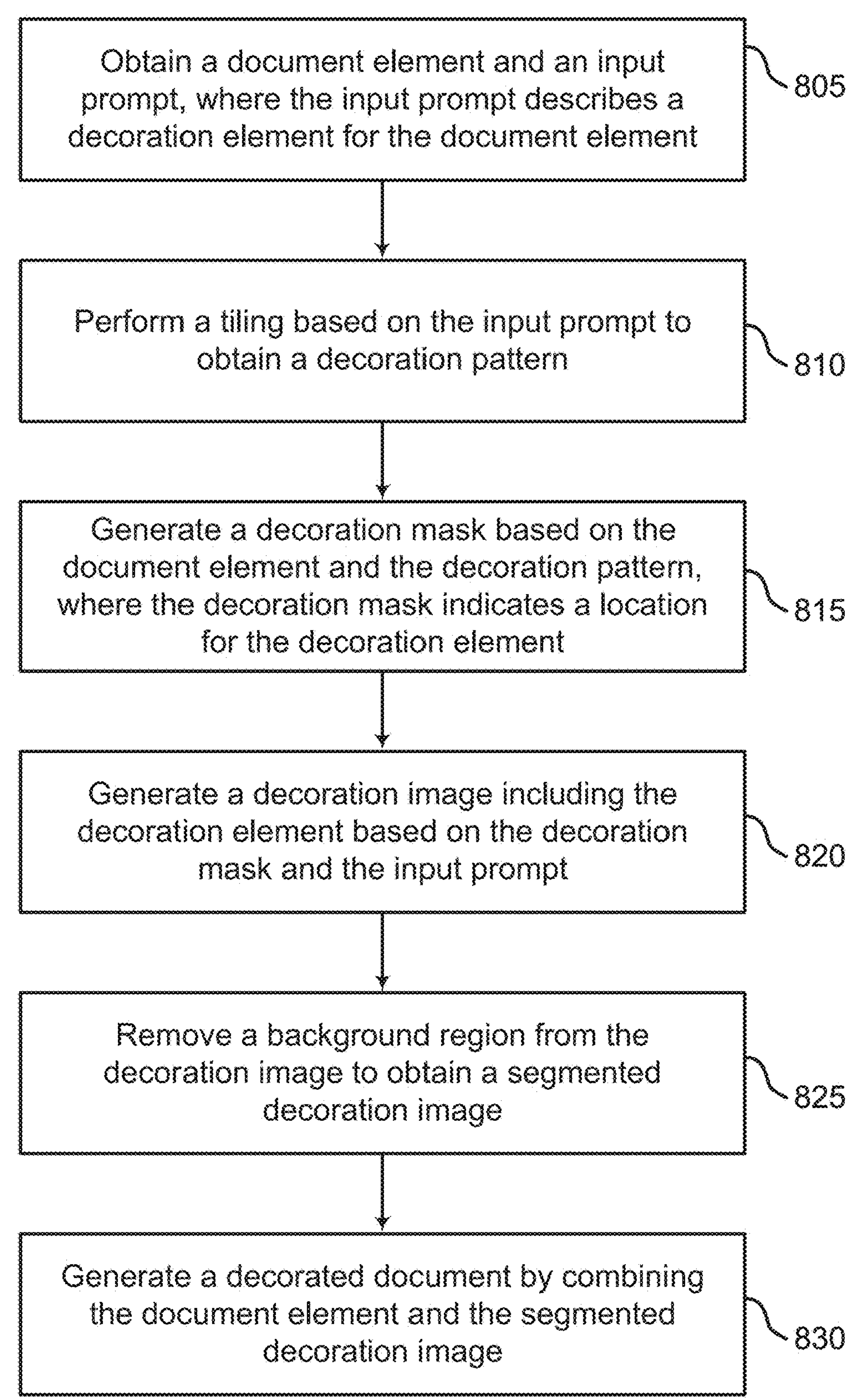
FIG. 8 shows a method for image processing according to aspects of the present disclosure.

FIG. 8 shows an example of a method 800 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains a document element and an input prompt, where the input prompt describes a decoration element for the document element. In some cases, the operations of this step refer to, or may be performed by, a mask generation component as described with reference to FIGS. 1, 3, 5, and 9.

In some examples, the document element can be a text box, an image, a shape, or an object within a document that is intended to be decorated. The input prompt may be a textual description provided by the user that specifies the desired style, pattern, or characteristics of the decoration element. The input prompt can include keywords, phrases, or sentences that convey the user's preferences for the decoration.

At operation 810, the system performs a tiling operation using the decoration element to obtain a decoration pattern. In some cases, the operations of this step refer to, or may be performed by, a tiling component as described with reference to FIGS. 1, 3, 5, and 9.

In some examples, the tiling process involves selecting a single pattern element based on the input prompt and repeating the single pattern element in a grid-like structure to create a target decoration pattern. For example, the tiling may be performed using a tiling operation with user-defined parameters. The resulting decoration pattern may be used for the subsequent steps in the decoration process.

At operation 815, the system generates a decoration mask based on the document element and the decoration pattern, where the decoration mask indicates a location for the decoration element. In some cases, the operations of this step refer to, or may be performed by, a mask generation component as described with reference to FIGS. 1, 3, 5, and 9.

In some examples, the decoration mask may be generated based on the dimensions, position, and shape of the document element. The region around the document element may be used in determining where the decoration should be applied. The decoration pattern may be masked using the decoration mask to obtain a masked decoration pattern that is consistent with the document element.

At operation 820, the system generates a decoration image including the decoration element based on the decoration mask and the input prompt. In some cases, the operations of this step refer to, or may be performed by, an image generation model as described with reference to FIGS. 1, 3, 5, and 9.

In some examples, the decoration image is generated using a generative model, such as a diffusion model, which takes the masked decoration pattern and the input prompt as inputs. The generative model learns to synthesize a visually appealing and coherent decoration image that incorporates the styles, patterns, and characteristics described in the input prompt. The generated decoration image blends with the document element.

At operation 825, the system removes a background region from the decoration image to obtain a segmented decoration image. In some cases, the operations of this step refer to, or may be performed by, a segmentation component as described with reference to FIGS. 1, 3, 5, and 9.

In some examples, the background removal process involves applying image segmentation techniques to separate the decoration element from the background. Segmentation techniques may be used in separating the decoration element from the background. For example, the background region may be identified and then removed, leaving the relevant decoration element in the segmented decoration image.

At operation 830, the system generates a decorated document by combining the document element and the segmented decoration image. In some cases, the operations of this step refer to, or may be performed by, a document generation component as described with reference to FIGS. 1, 3, 5, and 9.

In some examples, the decorated document is generated by integrating the segmented decoration image with the document element. For example, operation 830 may involve aligning the decoration image with the document element, adjusting its size and position, and blending the edges to create a visually coherent result. The output decorated document may demonstrate that the document element is modified in view of the stylized decoration element based on the text prompt.

Figure 9:
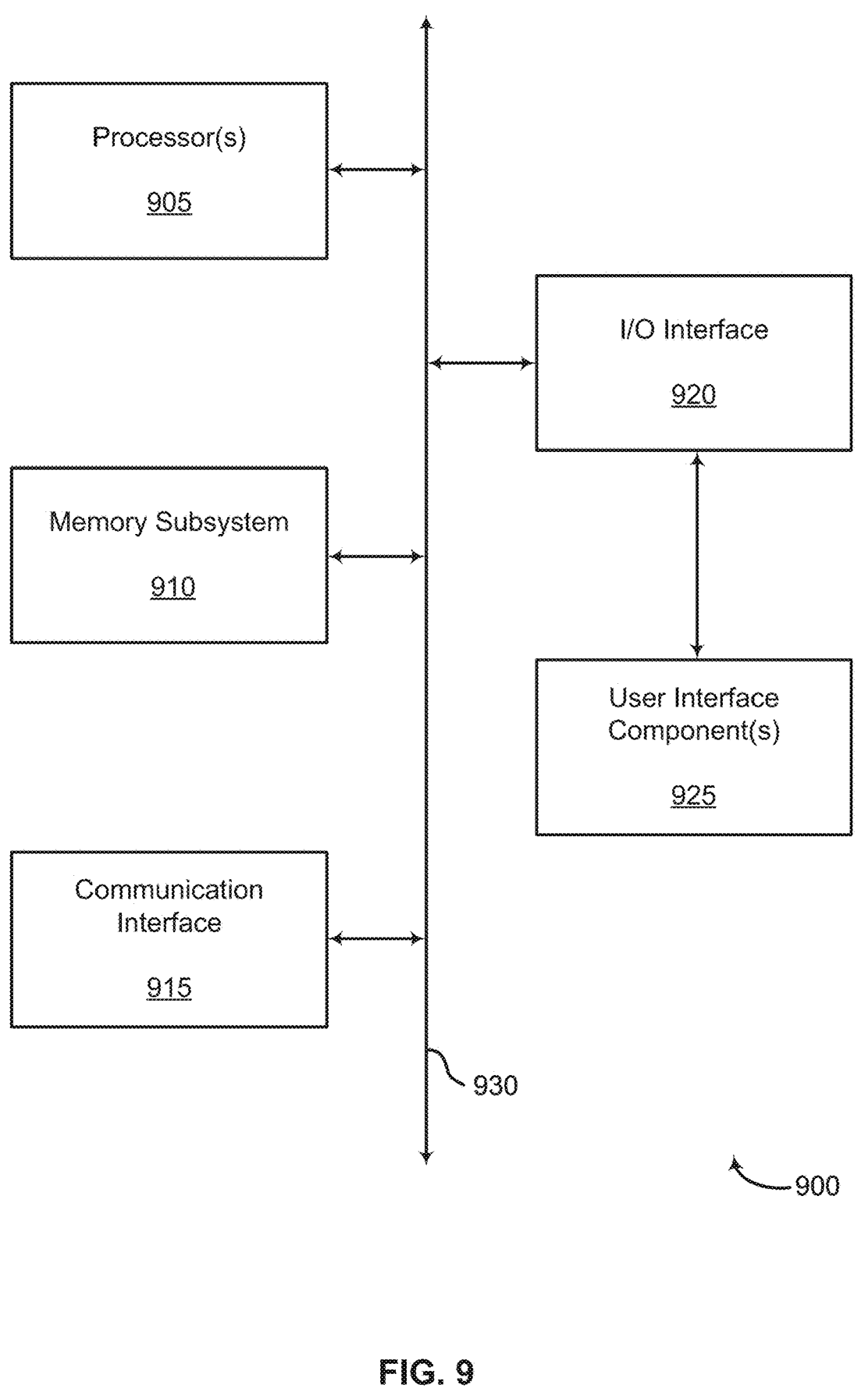

FIG. 9 shows an example of a computing device 900 according to aspects of the present disclosure. The computing device 900 is an example of, or includes aspects of, the corresponding element described with reference to FIGS. 1-6. The computing device 900 includes processor(s) 905, memory subsystem 910, communication interface 915, I/O interface 920, user interface component(s) 925, and channel 930.

In some embodiments, computing device 900 is an example of, or includes aspects of, the image generation apparatus described with reference to FIGS. 1-6. In some embodiments, computing device 900 includes one or more processors 905 that can execute instructions stored in memory subsystem 910 to generate synthetic images comprising a first attribute and a second attribute by providing a first attribute token to a first set layers of the image generation model during a first set of time-steps and providing a second attribute token to a second set of layers of the image generation model during a second set of time-steps According to some aspects, computing device 900 includes one or more processors 905. Processor(s) 905 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 910 includes one or more memory devices. Memory subsystem 910 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 915 operates at a boundary between communicating entities (such as computing device 900, one or more user devices, a cloud, and one or more databases) and channel 930 and can record and process communications. In some cases, communication interface 915 is provided to enable a processing system coupled to a transceiver (e.g., a transmitter and/or a receiver). In some examples, the transceiver is configured to transmit (or send) and receive signals for a communications device via an antenna.

According to some aspects, I/O interface 920 is controlled by an I/O controller to manage input and output signals for computing device 900. In some cases, I/O interface 920 manages peripherals not integrated into computing device 900. In some cases, I/O interface 920 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 920 or via hardware components controlled by the I/O controller.

According to some aspects, user interface component 925 enables a user to interact with computing device 900. In some cases, user interface component 925 includes an audio device, such as an external speaker system, an external display device such as a display screen, an input device (e.g., a remote-control device interfaced with a user interface directly or through the I/O controller), or a combination thereof. In some cases, user interface component 925 includes a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining a document element and an input prompt, wherein the input prompt describes a decoration element for the document element;

generating a decoration mask based on the document element, wherein the decoration mask indicates a location for the decoration element;

generating, using an image generation model, a decoration image based on the input prompt and the decoration mask, wherein the decoration image includes the decoration element, wherein generating the decoration image comprises obtaining the decoration element, performing a tiling operation using the decoration element to obtain a decoration pattern, and applying the decoration mask to the decoration pattern to obtain a masked decoration pattern, and wherein the decoration image is generated based on the masked decoration pattern; and generating a decorated document by combining the document element and the decoration image.

2. The method of claim 1, further comprising:

stylizing the decoration element to obtain a stylized decoration element, wherein the decoration pattern is based on the stylized decoration element.

3. The method of claim 1, further comprising:

obtaining a tiling parameter from a user, wherein the decoration element is tiled based on the tiling parameter.

4. The method of claim 1, further comprising:

generating, using the image generation model, an additional decoration image based on the input prompt and an additional decoration mask, wherein the decorated document includes a first page with the decoration image and a second page with the additional decoration image.

5. The method of claim 1, further comprising:

receiving a mask edit input from a user; and modifying the decoration mask based on the mask edit input to obtain a modified decoration mask, wherein the decoration image is generated based on the decoration mask.

6. The method of claim 1, wherein generating the decoration image comprises:

performing a combination of a first diffusion-based editing algorithm and a second diffusion-based editing algorithm.

7. The method of claim 6, wherein:

the first diffusion-based editing algorithm comprises a SDEdit and the second diffusion-based editing algorithm comprises a DiffEdit.

8. The method of claim 6, further comprising:

obtaining a stylization strength parameter from a user, wherein the combination of the first diffusion-based editing algorithm and the second diffusion-based editing algorithm are combined based on the stylization strength parameter.

9. The method of claim 1, further comprising:

removing a background region from the decoration image to obtain a segmented decoration image, wherein the decorated document is generated using the segmented decoration image.

10. The method of claim 1, further comprising:

selecting a first decoration mode based on a presence of the input prompt, wherein the decorated document is generated based on the first decoration mode.

11. The method of claim 1, further comprising:

selecting a second decoration mode; and generating an alternative decorated document independent of the input prompt based on the second decoration mode.

12. A non-transitory computer readable medium storing code for image processing, the code comprising instructions executable by a processor to:

obtain a document element and a decoration element;

perform a tiling operation using the decoration element to obtain a decoration pattern;

generate a decoration mask based on the document element and the decoration pattern, wherein the decoration mask indicates a location for the decoration element;

generate a decoration image including the decoration element based on the decoration mask and the input prompt;

remove a background region from the decoration image to obtain a segmented decoration image; and generate a decorated document by combining the document element and the segmented decoration image.

13. The non-transitory computer readable medium of claim 12, the code further comprising instructions executable by a processor to:

receive a mask edit input from a user; and modify the decoration mask based on the mask edit input to obtain a modified decoration mask, wherein the decoration image is generated based on the decoration mask.

14. The non-transitory computer readable medium of claim 12, wherein generating the decoration image comprises:

performing a combination of a first diffusion-based editing algorithm and a second diffusion-based editing algorithm.

15. An apparatus comprising:

at least one processor;

at least one memory storing instructions executable by the at least one processor to perform operations comprising:

generate a decoration mask based on a document element, wherein the decoration mask indicates a location for a decoration element;

generate a decoration pattern by performing a tiling operation using the decoration element;

generate, using an image generation model, a decoration image including the decoration pattern based on the decoration mask and an input prompt that describes the decoration element; and generate a decorated document by combining the document element and the decoration image; and.

16. The apparatus of claim 15, the operations further comprising:

remove a background region from the decoration image to obtain a segmented decoration image, wherein the decorated document is generated using the segmented decoration image.

17. The apparatus of claim 15, further comprising:

a user interface configured to receive a stylization strength parameter, wherein the decoration image is generated based on the stylization strength parameter.

18. The apparatus of claim 15, wherein:

the image generation model comprises a diffusion model.

* * * * *